United States Patent
Sheridan

(10) Patent No.: US 6,583,869 B1
(45) Date of Patent: Jun. 24, 2003

(54) NON-CONTACT POSITIONING APPARATUS

(75) Inventor: Miles Sheridan, Bristol (GB)

(73) Assignee: BAE Systems PLC, Farnborough (GB)

( * ) Notice: Subject to any disclaimer, the term of this patent is extended or adjusted under 35 U.S.C. 154(b) by 0 days.

(21) Appl. No.: 09/460,714

(22) Filed: Dec. 14, 1999

(30) Foreign Application Priority Data

Dec. 24, 1998 (GB) .............................................. 9828473

(51) Int. Cl.⁷ ........................... G01N 11/26; G01B 11/24
(52) U.S. Cl. ....................................... 356/153; 356/601
(58) Field of Search ............................... 356/153, 601, 356/602, 609; 33/642, 535

(56) References Cited

U.S. PATENT DOCUMENTS

| | | | |
|---|---|---|---|
| 4,406,069 A | * 9/1983 | Clement | 33/642 |
| 4,427,880 A | 1/1984 | Kanade et al. | |
| 4,789,243 A | 12/1988 | Mathur | |
| 5,071,252 A | 12/1991 | Matsuura | |
| 5,298,977 A | * 3/1994 | Shintani et al. | 356/603 |
| 5,793,483 A | 8/1998 | Zehnpfennig et al. | |
| 6,115,128 A | * 9/2000 | Vann | 33/623 |

FOREIGN PATENT DOCUMENTS

| | | |
|---|---|---|
| DE | 197 11 361 | 9/1998 |
| EP | 0 385 528 | 9/1990 |
| EP | 0 534 288 | 3/1993 |
| EP | 0 851 211 | 7/1998 |
| JP | 02002902 | 1/1980 |
| JP | 63225108 | 9/1988 |
| JP | 01057103 | 3/1989 |

\* cited by examiner

Primary Examiner—Richard A. Rosenberger
(74) Attorney, Agent, or Firm—Nixon & Vanderhye P.C.

(57) ABSTRACT

Non-contact apparatus for positioning a surface working, testing or inspection device (1) relative to a surface to be worked, tested or inspected (2) at a desired position and orientation relative thereto (3b) including a baseplate (4) locatable at a distance away from the surface (2), means (5) for mounting the surface working, testing or inspection device on the baseplate (4), three or more range finder units (6a, 6b, 6c) removably mounted in spaced array (6d) on the baseplate (4), each of-which three or more range finder units (6a, 6b, 6c) includes a source (7) for impinging a beam (8) of ultra violet, visible light or infra red radiation on the surface (12), a detector (9) for imaging the impinging radiation (12) and for calculating a distance measurement (10a) from a datum location on the respective source (11a) the apparatus also including. transformation means for translating each of the range finder distance measurements (10a, 10b, 10c) into a common baseplate coordinate frame of reference (14), a processor (15) for receiving and processing the distance measurements (10a, 10b, 10c) to establish therefrom a first orientation and position (3a) of the surface (2) relative to the baseplate (4), and thus to the surface working, testing or inspection device (1) when mounted thereon, and indexing means (16). in operative association with the processor (15) for positioning the baseplate (4) and surface working, testing or inspection device (1) when mounted thereon at the desired position and orientation (3b) relative to the surface (2).

22 Claims, 10 Drawing Sheets

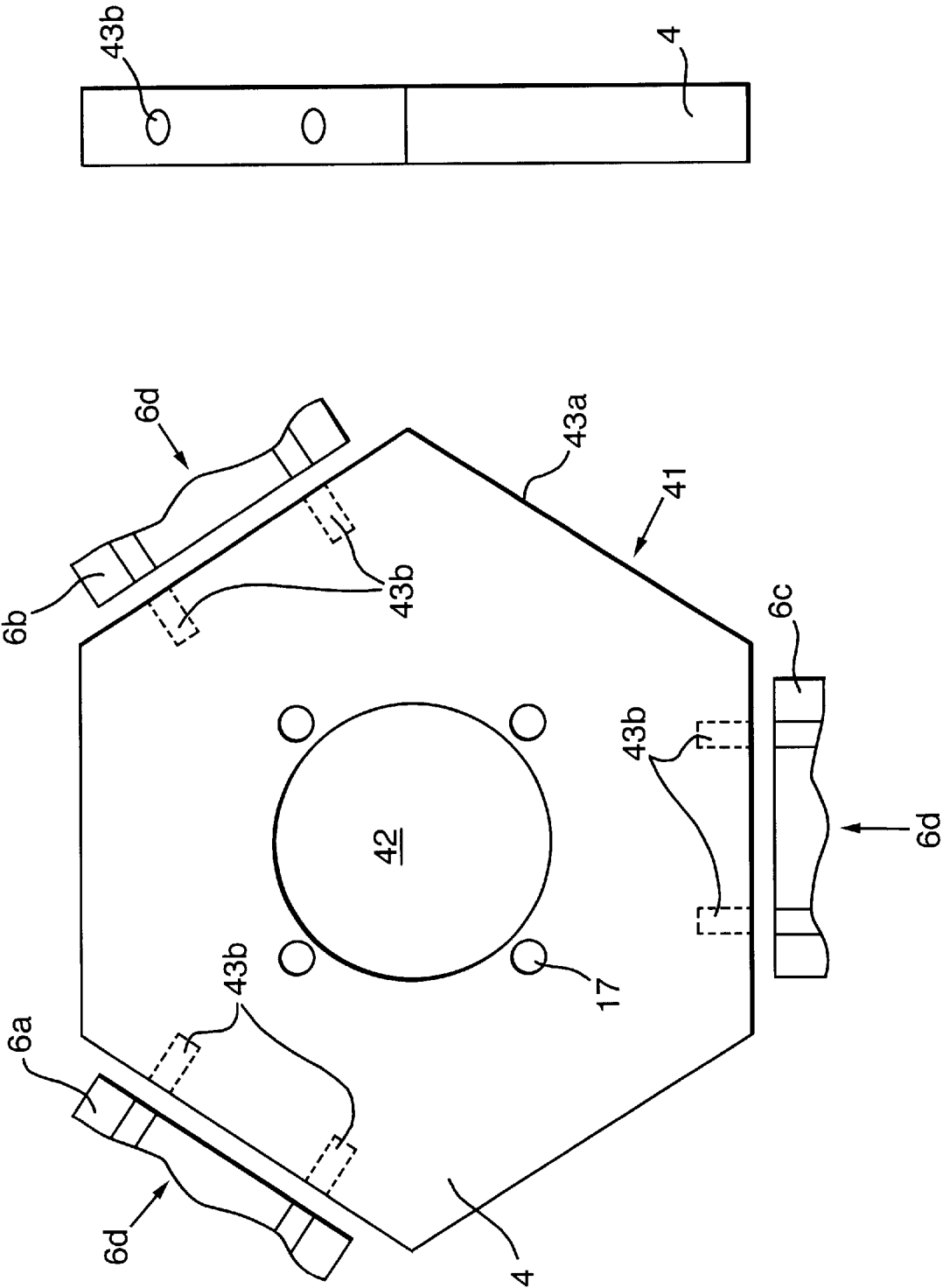

NON-CONTACT POSITIONING APPARATUS

BACKGROUND OF THE INVENTION

1. Field of the Invention

This invention relates to a non-contact positioning apparatus and method suitable particularly, but not exclusively, for positioning a surface working, testing or inspection device relative to a surface to be worked, tested or inspected at a desired position and orientation relative thereto.

2. Discussion of Prior Art

Conventional techniques used in aircraft wing assembly include the use of drilling templates to define hole positions therealong for components such as fasteners. Frequently, additional tooling is required to ensure that the holes are drilled normal to the wing surface, each of which holes is drilled by a worker and requires considerable skill to achieve the required tolerances. Once inserted into their designated hole location, if the fasteners protrude from the wing skin, an additional operation is required to remove the protruding part. As tolerances are typically tighter than 0.5° off normal, the number of holes failing to meet the specifications can be significant. Current practice is thus costly in terms of the additional tooling set up time, drilling time and costs of parts. Various non-contact measurement systems have been developed in an attempt to address these issues, concentrating on measuring the orientation and position of the surface to be worked relative to a working component. Specifically, laser line rangefinders have been used to project a cross-hair onto a surface and the angle between the two cross-hair arms provides information regarding the orientation of the surface relative to rangefinder arrangement. However, the non-Gaussian spread of the laser line has proven to be significant, reducing the ability of the system to measure the surface position and orientation and thus failing to satisfy tolerancing requirements. A system including four lasers in an integrated unit has also been developed, which lasers project laser spots on a surface. The spots are imaged using a single camera to measure the relative spot centre positions and the degree of ellipticality thereof. In this case the accuracy and functionality are limited by the proximity of the laser spots within the integrated unit.

SUMMARY OF THE INVENTION

There is therefore a need for a device positioning apparatus which enables accurate positioning of a device relative to a surface within a specified tolerance, reduces extraneous procedures and components on the wing surface, and reduces the time taken to perform the drilling operation.

According to a first aspect of the present invention there is provided a non-contact apparatus for positioning a surface working, testing or inspection device relative to a surface to be worked, tested or inspected at a desired position and orientation relative thereto, including a baseplate locatable at a distance away from the surface, means for mounting the surface working, testing or inspection device on the baseplate, three or more range finder units removably mounted in spaced array on the baseplate, each of which units includes a source for impinging a beam of electromagnetic radiation on the surface, and a detector for imaging the impinging radiation and for calculating a distance measurement from a datum location on the respective source to a point corresponding to the surface beam impingement, the apparatus also including transformation means for translating each of said range finder distance measurements into a common baseplate co-ordinate frame of reference, a processor for receiving and processing the distance measurements to establish therefrom a first orientation and position of the surface relative to the baseplate, and thus to the surface working, testing or inspection device when mounted thereon, and indexing means in operative association with the processor for positioning the baseplate and surface working, testing or inspection device when mounted thereon at the desired position and orientation relative to the surface.

Preferably the means for mounting the surface working, testing or inspection device on the baseplate includes at least four equi-spaced holes through the baseplate, at least four externally threaded shank bolts locatable through said holes, and a substantially rigid removable housing attachable to the surface working, testing or inspection device, which removable housing is a hollow cylinder with at least one end partially open, which partially open end has at least, four transverse internally threaded equi-spaced holes for threadable engagement by said shank bolts for securing the housing to the baseplate.

Conveniently the transformation means includes mapping vector means operable to provide a position mapping vector and a direction mapping vector for each of the range finders, which position mapping vectors describe each range finder datum location by axial, transverse and perpendicular components in the baseplate co-ordinate frame of reference, which baseplate co-ordinate frame is characterised by axial, transverse and perpendicular orthogonal axes, and which direction mapping vectors describe the normality of each range finder sensor relative to the surface to be worked, tested or inspected by vectoral axial, transverse and perpendicular components in the baseplate co-ordinate frame of reference.

Advantageously the mapping vector means includes a substantially rigid, substantially planar calibration plate locatable at an array of calibration positions between the baseplate and the surface, which calibration plate is, at each of the calibration positions, located substantially parallel to the baseplate, gauge blocks of a pre-determined thickness locatable between the baseplate and the calibration plate, which gauge blocks provide means for determining the axial components of the position mapping vectors, and a surface measuring instrument, which surface measuring instrument provides means for determining the transverse and perpendicular components of the position mapping vectors and thence the direction mapping vectors.

Preferably there is a series of communication links between the processor and each range finder unit for receiving the distance measurements, which links include a control box in operative association with a power supply, which control box is operable to sample the range finder distance measurements at a desired rate, a multi-core cable connecting the range finder unit to the control box, and a serial cable connected between the control box and the processor for communicating the sampling rate to the control box.

Conveniently the indexing means includes a robotic arm having six servo motors attached thereto, which arm is rigidly connected to the removable housing and thereby to the surface working, testing or inspection device when attached thereto, a robot controller for controlling the servo motors, which robot controller is connected to the processor by a serial cable for receiving therefrom a 4×4 (four row four column) homogenous matrix describing a rotation and translation required to position the baseplate and thereby the surface working, testing or inspection device when mounted thereon, at the desired position and orientation relative to the surface to be worked, tested or inspected.

Advantageously the baseplate is a substantially rigid substantially regular hexagonal plate with a hole therethrough substantially in the centre thereof, which hole is of sufficient diameter to allow any axially protruding parts of the surface working, testing or inspection device to pass therethrough when the surface working, testing or inspection device is attached to the substantially rigid removable housing and thence to the baseplate.

Preferably each of the three or more range finder units is attachable to an outer perimeter of the baseplate by bolt means, and wherein the units are equi-spaced therearound.

Conveniently each range finder unit has a radiation source with a laser spot of 635 nm wavelength.

Advantageously the surface working, testing or inspection device is a drill.

Preferably the surface working, testing or inspection device is a welding torch.

Conveniently there are four range finder units.

According to a further aspect of the present invention there is provided a method for positioning a surface working, testing or inspection device relative to a surface to be worked, tested or inspected at a desired position and orientation thereto, in which the surface working, testing or inspection device is mounted on the baseplate locatable at a distance away from the surface, three or more range finder units are removably mounted in spaced array on the baseplate, each of which units includes a source of electromagnetic radiation and a detector for the radiation, a beam of said radiation is impinged by each unit on the surface, imaged by the detectors and used to calculate a distance measurement from a datum location on the respective source to a point corresponding to the surface beam impingement, each of said range finder distance measurements is translated by transformation means into a common baseplate co-ordinate frame of reference, the distance measurements are processed by a processor to establish therefrom an orientation and position of the surface relative to the baseplate, and thus to the surface working, testing or inspection device mounted thereon, and the baseplate and surface working, testing or inspection device is positioned at the desired position and orientation relative to the surface by an indexing means in operative association with the processor.

Preferably the transformation means is operated to provide a position mapping vector and a direction mapping vector for each of the range finders, which position mapping vectors describe each range finder datum location by vector axial, transverse and perpendicular components in the baseplate co-ordinate frame of reference, and which direction mapping vectors describe the normality of each range finder sensor relative to the surface to be worked, tested or inspected by vectoral axial, transverse and perpendicular components in the baseplate co-ordinate frame of reference.

Conveniently the axial components of the position mapping vectors are determined from a geometric fit to a series of gauge block height measurements corresponding to the surface beam impingement distance measurements returned by each of the at least three range finder units, which beam impingement is provided by a substantially rigid calibration plate positioned substantially parallel to the baseplate, and which series of height measurements is provided by a positioning of the calibration plate at an array of calibration positions thereunder, and in which the transverse and perpendicular components of the position mapping vectors are determined from a regressive fit to an array of beam impingement points located in the plane of the calibration plate by a surface measuring instrument, which array of beam impingement points is provided by the array of calibration plate calibration positions.

Advantageously the distance measurements are processed by determining a first position and orientation of the surface working, testing or inspection device relative to the surface, determining a required translation and/or rotation of the surface working, testing or inspection device in the baseplate co-ordinate frame of reference in order to move said device to the desired position and orientation, and decoding the required translation and/or rotation of the surface working, testing or inspection device from the baseplate co-ordinate frame of reference into a co-ordinate frame of reference of the indexing means.

Preferably the first position and orientation is determined by forming a baseplate transformation equation for each range finder unit, which transformation equation combines each respective distance measurement with each of the position mapping vectors and the direction mapping vectors, thereby defining, for each of the range finder units in turn, co-ordinates of the respective surface beam impingement point in the baseplate co-ordinate frame of reference, combining the beam impingement points in the baseplate co-ordinate frame of reference by vectoral subtraction therebetween so as to provide at least two surface vectors, taking a cross-product of the at least two surface vectors so as to provide a vector normal thereto, and from thence a unit vector, and taking a scalar product of the vector normal and any one of said beam impingement points in the baseplate co-ordinate frame of reference so as to define a first position plane.

Conveniently the required translation and/or rotation is determined by processing a first transformation, which first transformation defines a translation and rotation from the first position and orientation to a temporary position and orientation, and a second transformation, which second transformation defines a translation and rotation from the temporary position and orientation to the desired position and orientation, and combining the first and second transformations by matrix multiplication of said first and the inverse of said second transformations to provide a standard 4×4 (four row, four column) homogenous matrix describing the required rotation and translation in the baseplate co-ordinate frame of reference.

Advantageously the temporary position and orientation is defined by means of a temporary co-ordinate system, which temporary co-ordinate system is defined by an origin and orthogonal axial, transverse and perpendicular axes, which axial axis is given by the unit vector normal and which transverse axis is given by a cross-product of said unit vector normal and a main axis unit vector, which main axis vector is defined as equal to the axial axis of the baseplate co-ordinate frame and is constrained to pass through a single point corresponding to an average of the at least three range finder position mapping vectors, and which temporary co-ordinate system origin is given by an intersection of the main axis vector with the first position plane.

Preferably the first transformation translation is given by a 3-by-1 (three row, one column) translation matrix defined by translational components of a vector connecting an initial displacement from the surface to be worked, tested or inspected and the temporary co-ordinate system origin, which initial displacement is defined by the first position plane, and the first transformation rotation is given by a 3-by-3 (three row, three column) rotation matrix having the temporary co-ordinate system transverse axis as its first component, the temporary co-ordinate system axial axis as its third component and the cross product of said first and third components as its second component, and in which the second transformation translation is given by a 3-by-1 (three row, one column) translation matrix defined by translational components of a vector connecting the temporary co-ordinate system origin and a required displacement therefrom, which displacement is defined by a plane describing the desired position and orientation of the baseplate relative to the surface, and in which the second transformation rotation is given by a 3-by-3 (three row, three column) rotation matrix having the temporary co-ordinate system transverse axis as its first component, a unit vector normal to the desired position plane as its third component and a cross product of said first and third components as its second component.

Conveniently the required translation and/or rotation of the surface working, testing and inspection device in the baseplate co-ordinate frame of reference is decoded into the indexing means co-ordinate frame of reference by matrix multiplication of a baseplate to indexing means matrix mapping, the 4×4 (four row, four column) homogenous matrix describing the required rotation and translation in the baseplate co-ordinate frame of reference, and the inverse of the baseplate to indexing means matrix mapping.

Advantageously the baseplate to indexing means matrix mapping translates the baseplate co-ordinate frame of reference into the indexing means co-ordinate frame of reference, which mapping is substantially constant.

BRIEF DESCRIPTION OF THE DRAWINGS

For a better understanding of the present invention, and to show how the same may be carried into effect, reference will now be made, by way of example, to the accompanying drawings, in which:

FIG. 9 is a plan view of the baseplate of FIG. 3 including three range finder units, FIG. 10 is an end view of the baseplate of FIG. 9.

DETAILED DISCUSSION OF EMBODIMENTS

Non-contact apparatus for positioning a surface working, testing or inspection device relative to a surface to be worked, tested or inspected at a desired position and orientation relative thereto as shown in FIGS. 1 to 12 is intended for use in situations where the displacement from and the orientation to the surface relative to the device is required to a specified accuracy and where the procedure is, or can be automated. Such apparatus is thus particularly suited to the manufacture and assembly of aerospace artefacts such as aircraft wings, where numerous multi-sized holes are required for fastening and securing purposes, the positioning of which holes is crucial and the size thereof typically includes tight tolerancing.

Figure 1:
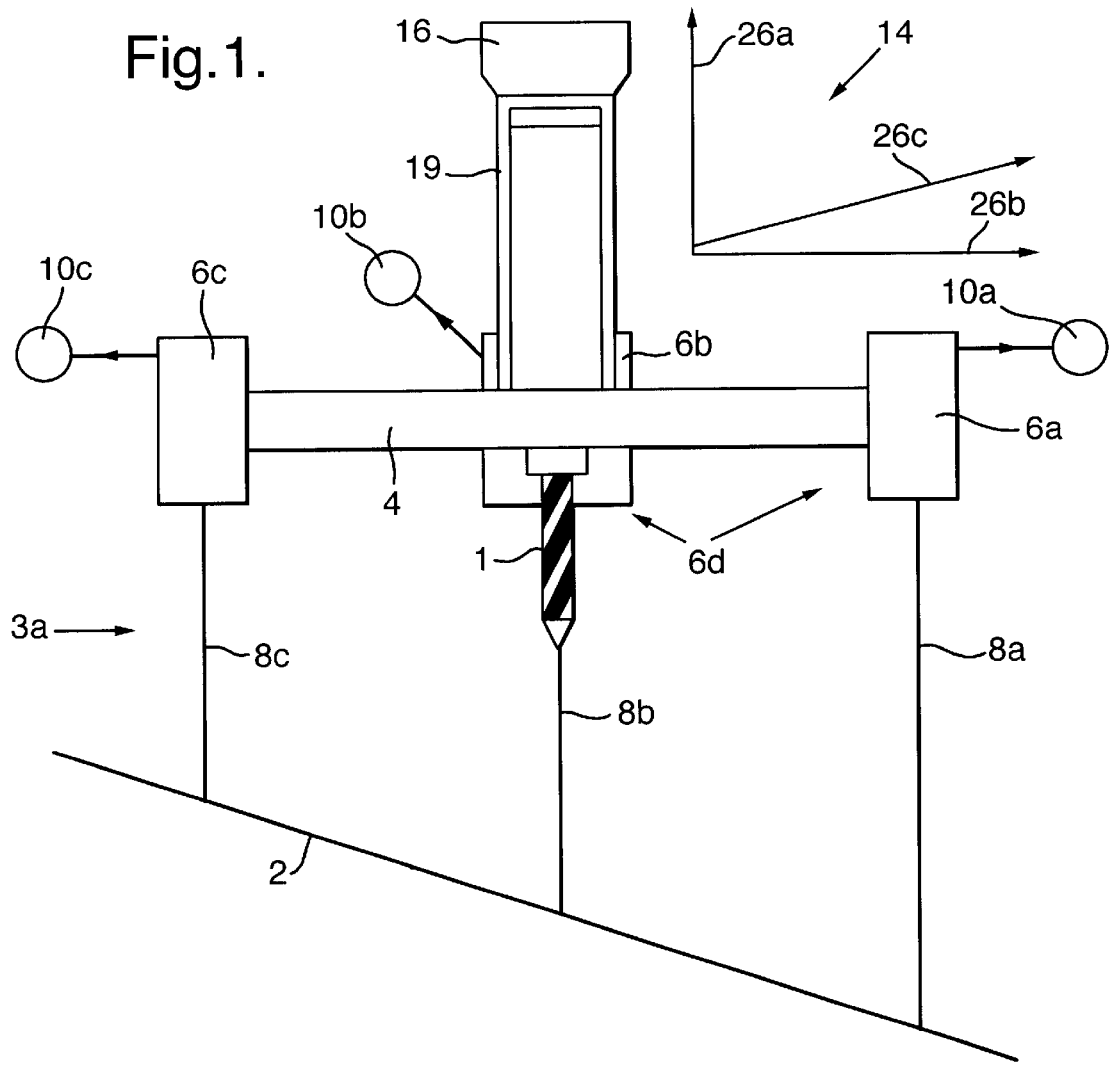
FIG. 1 is a diagrammatic elevational view of non-contact apparatus according to a first embodiment of the present invention for positioning a surface working, testing or inspection device relative to a surface to be worked, tested or inspected at a desired position and orientation thereto according to a first embodiment of the present invention.
Figure 2:
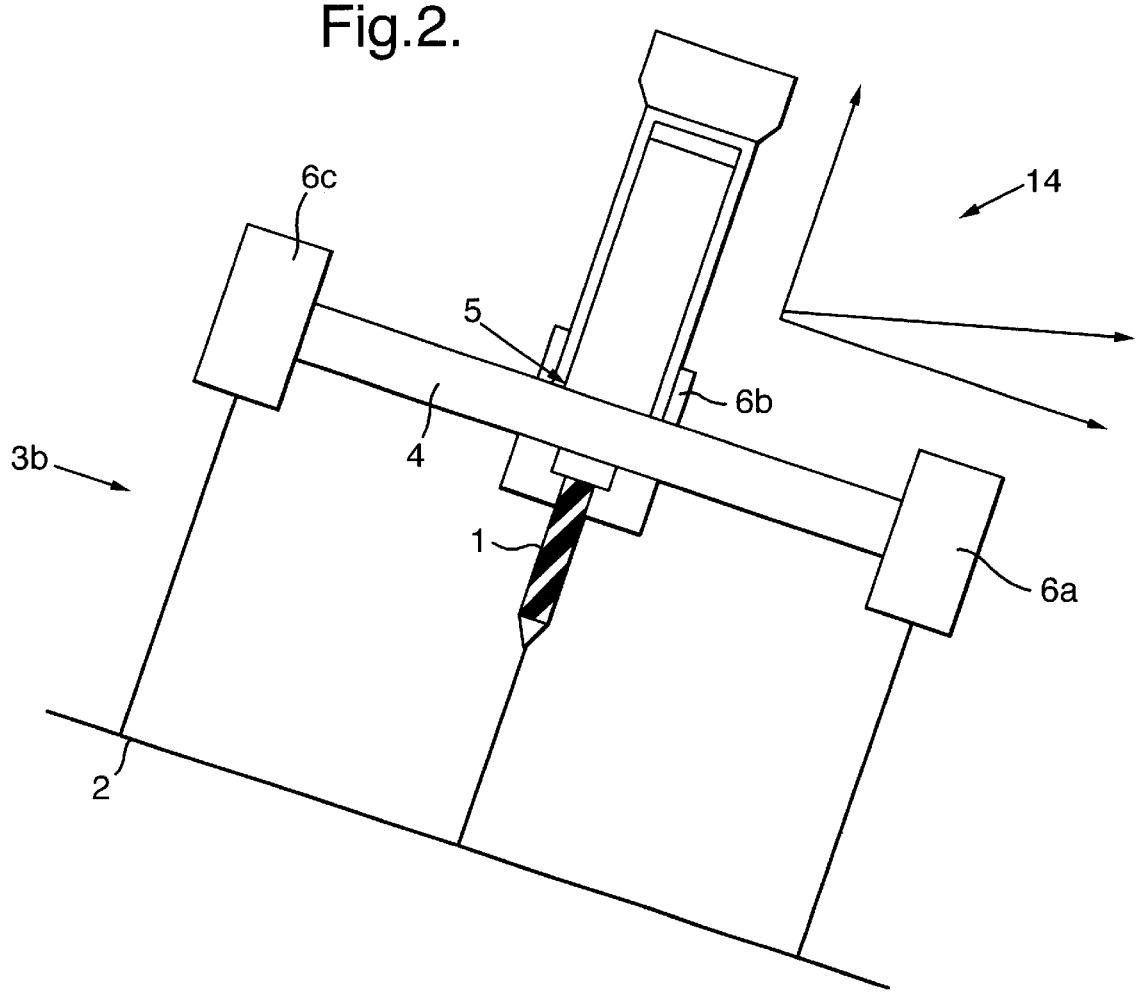
FIG. 2 is a diagrammatic elevational view of the apparatus of FIG. 1 in the desired position and orientation.
Figure 3:
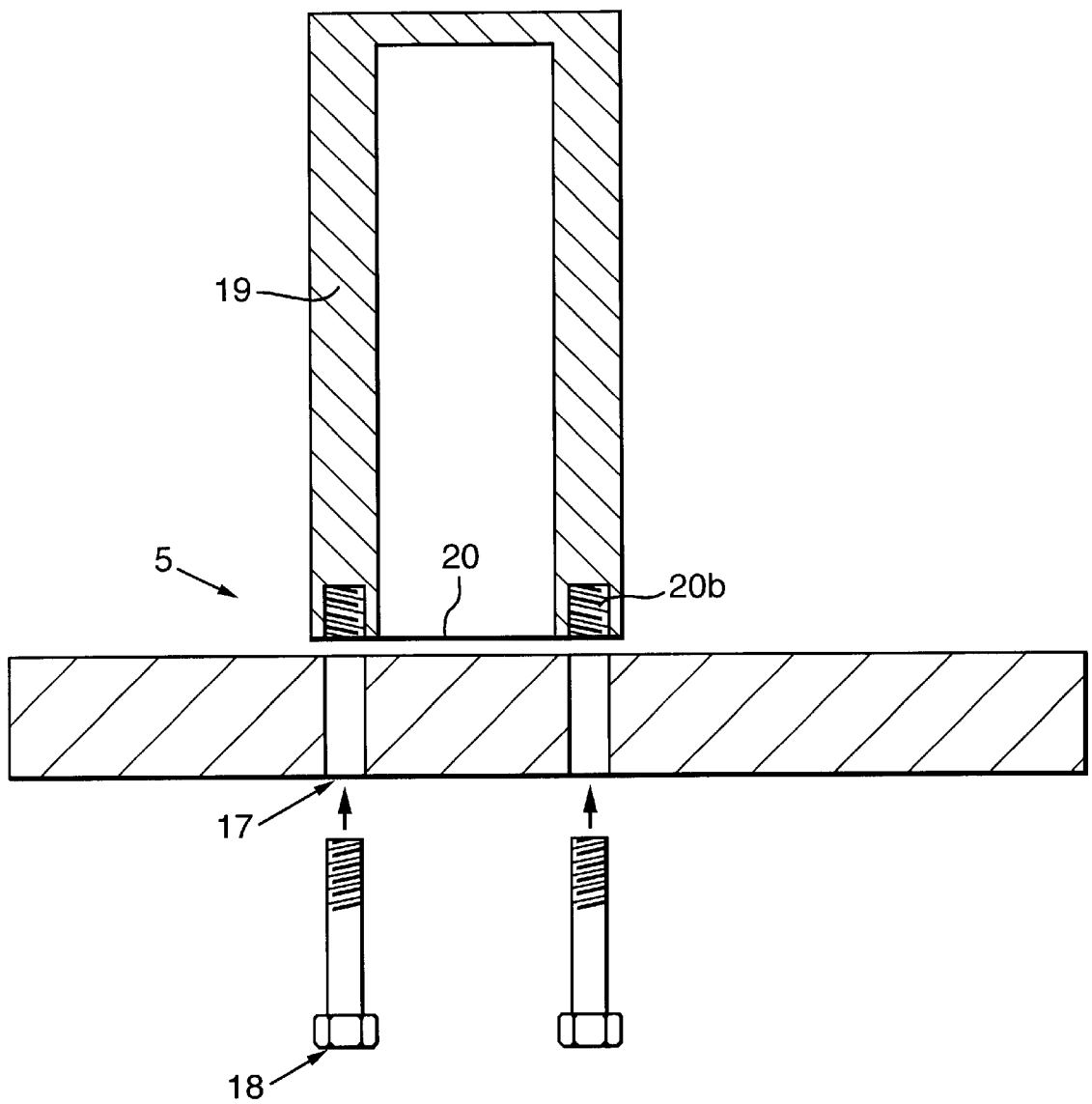
FIG. 3 is a transverse sectioned side view of means according to the present invention for mounting the surface working, testing or inspection device on a baseplate.
Figure 4:
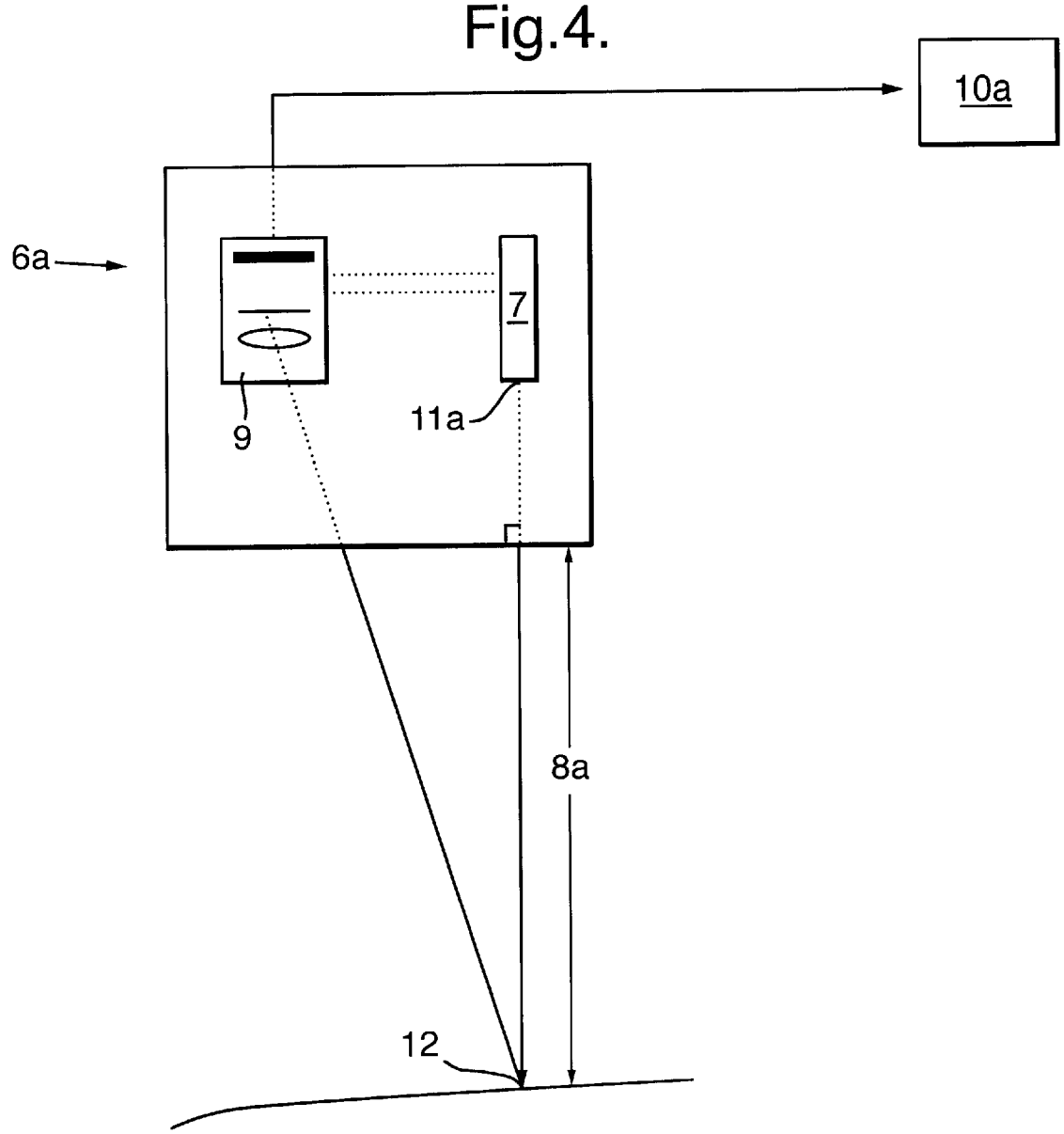
FIG. 4 is a diagrammatic view of one of three or more range finder units of the apparatus of FIG. 1 showing means for calculating distance measurements from the surface to be worked, tested or inspected.

Thus as shown in FIGS. 1 and 2 of the accompanying drawings, non-contact apparatus for positioning a surface working, testing or inspection device 1 relative to a surface to be worked, tested or inspected 2 at a desired position and orientation relative thereto 3b includes a baseplate 4 locatable at a distance away from the surface 2, means 5 for mounting the surface working, testing or inspection device on the baseplate 4 as shown in FIG. 3, three or more range finder units 6a, 6b, 6c removably mounted in spaced array 6d on the baseplate 4 as shown generally in FIG. 1, each of which three or more range finder units 6a, 6b, 6c includes a source 7 for impinging a beam 8 of electromagnetic radiation on the surface 12, and a detector 9 for imaging the impinging radiation 12 and for calculating a distance measurement 10a from a datum location on the respective source 11a as shown in FIG. 4. The apparatus also includes transformation means, shown in FIG. 11, for translating each of the range finder distance measurements 10a, 10b, 10c into a common baseplate co-ordinate frame of reference 14, a processor 15, shown functionally in FIG. 7, for receiving and processing the distance measurements 10a, 10b, 10c to establish therefrom a first orientation and position 3a of the surface 2 relative to the baseplate 4, and thus to the surface working, testing or inspection device 1 when mounted thereon, and indexing means 16, shown in FIG. 1, in operative association with the processor 15 for positioning the baseplate 4 and surface working, testing or inspection device 1 when mounted thereon at the desired position and orientation 3b relative to the surface 2.

As shown in FIG. 3 and FIG. 9 the means 5 for mounting the surface working, testing or inspection device 1 on the baseplate 4 includes at least four equi-spaced holes 17 through the baseplate 4, at least four externally threaded shank bolts 18 locatable through the holes 17, and a substantially rigid removable housing 19 attachable to the surface working, testing or inspection device 1, which removable housing 19 is a hollow cylinder with at least one end partially open 20, which partially open end 20 has at least four transverse internally threaded equi-spaced holes 20b for threadable engagement by said shank bolts 18 for securing the housing 19 to the baseplate 4.

Figure 5:
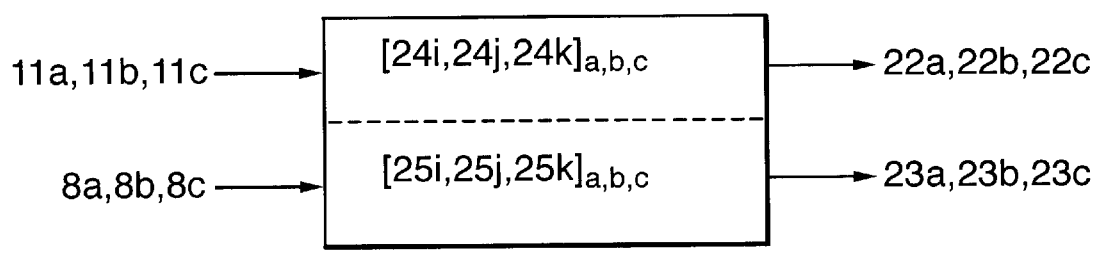
FIG. 5 is a block diagram of transformation means included in the apparatus of the invention for positioning a surface working, testing or inspection device for one range finder unit.
Figure 6:
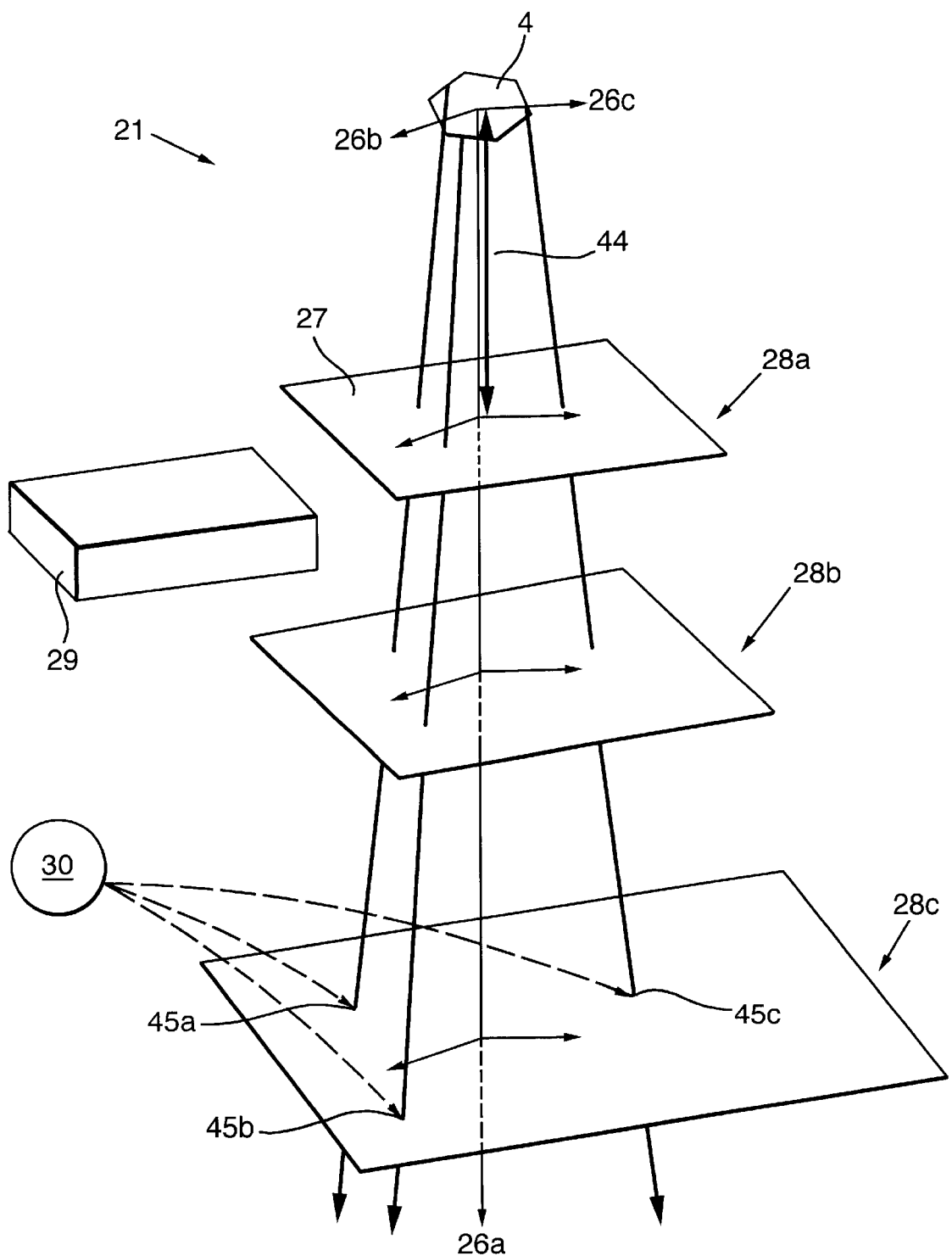
FIG. 6 is a perspective view of part of the transformation means of FIG. 5 showing mapping vector means for one range finder unit.

The transformation means includes mapping vector means 21, shown in FIG. 6, operable to provide a position mapping vector 22a, 22b, 22c and a direction mapping vector 23a, 23b, 23c shown in FIG. 5, for each of the range finders 6a, 6b, 6c, which position mapping vectors 22a, 22b, 22c describe each range finder datum location 11a, 11b, 11c by axial, transverse and perpendicular components $[24i, 24j, 24k]_{a,b,c}$ in the baseplate co-ordinate frame of reference 14.

The baseplate co-ordinate frame is characterised by axial, transverse and perpendicular orthogonal axes 26a, 26b, 26c, as shown in FIG. 1, and the direction mapping vectors 23a, 23b, 23c describe the normality of each of the range finder sources 7 relative to the surface to be worked, tested or inspected through perpendicular distances 8a, 8b, 8c by vectoral axial, transverse and perpendicular components $[25i, 25j, 25k]_{a,b,c}$ as shown in FIG. 4.

As shown in FIG. 6, the mapping vector means 21 includes a substantially rigid, substantially planar calibration plate 27 locatable at an array of calibration positions 28a, 28b, 28c between the baseplate 4 and the surface 2, which calibration plate 27 is, at each of the calibration positions 28a, 28b, 28c, located substantially parallel to the baseplate 4. The mapping vector means 21 also includes gauge blocks 29 of a pre-determined thickness locatable between the baseplate 4 and the calibration plate 27, which gauge blocks provide means for determining the axial components of the position mapping vectors 22a, and a surface measuring instrument 30 which provides means for determining the transverse and perpendicular components of the position mapping vectors 22b, 22c and thence the direction mapping vectors 23a, 23b, 23c.

Figure 7:
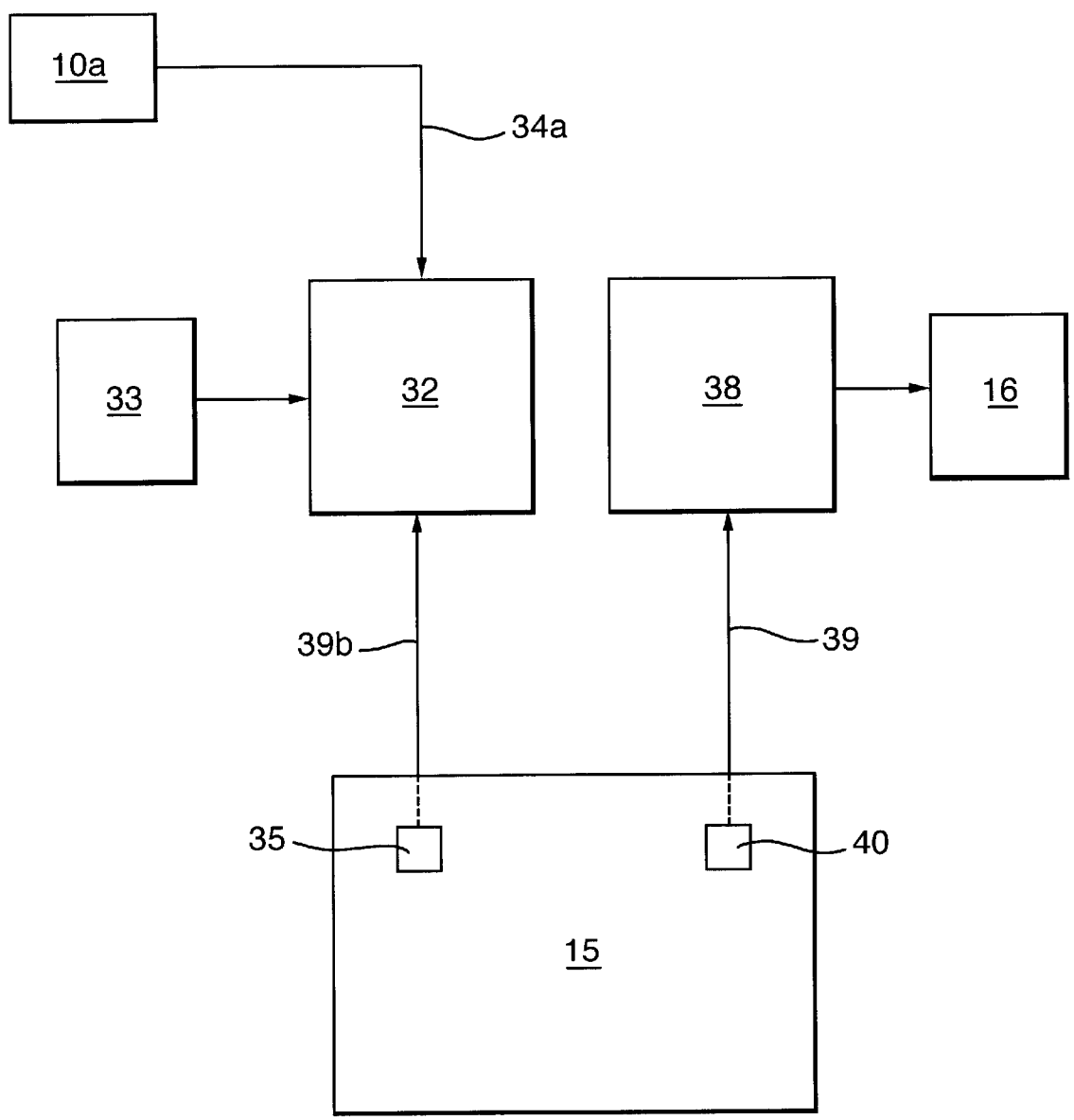
FIG. 7 is a block diagram of means for processing the distance measurement of FIG. 4 for one range finder unit.
Figure 8:
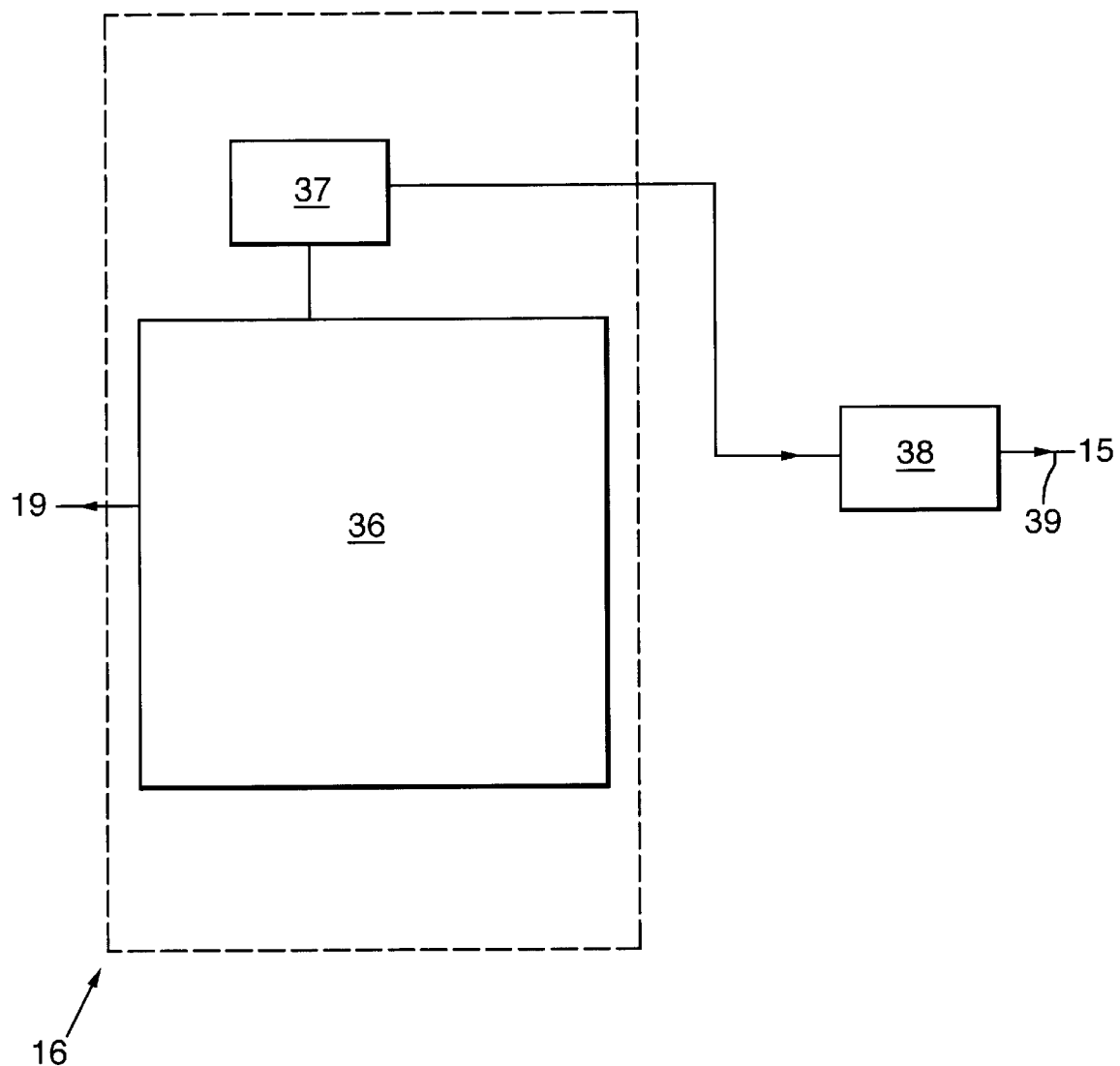
FIG. 8 is a block diagram of indexing means for positioning the apparatus of FIG. 1.

The processor 15 is connected to each range finder unit 6a, 6b, 6c by a series of communication links 31, as shown in FIG. 7. These links 31, shown functionally in FIG. 7 for one range finder unit only, include a control box 32 in operative association with a power supply 33, which control box 32 is operable to sample the range finder distance measurement 10a at a desired rate 35. The links 31 also include a multi-core cable 34a connecting the range finder unit 6a to the control box 32, and a serial cable 34b connected between the control box 32 and the processor 15 for communicating the sampling rate 35 to the control box 32. The indexing means 16 includes a robotic arm 36 having six servo motors attached thereto 37, as shown schematically in FIG. 8, which arm 36 is rigidly connected to the removable housing 19 and thereby to the surface working, testing or inspection device 1 when attached thereto. The indexing means also includes a robot controller 38 for controlling the servo motors 37, which robot controller 38 is connected to the processor 15 by a serial cable 39 for receiving therefrom a four row, four column homogenous matrix 40, shown functionally in FIG. 11, describing a rotation and translation 47 required to position the baseplate 4 and thereby the surface working, testing or inspection device 1 when mounted thereon, at the desired position and orientation 3b relative to the surface to be worked, tested or inspected 2.

Figure 12:
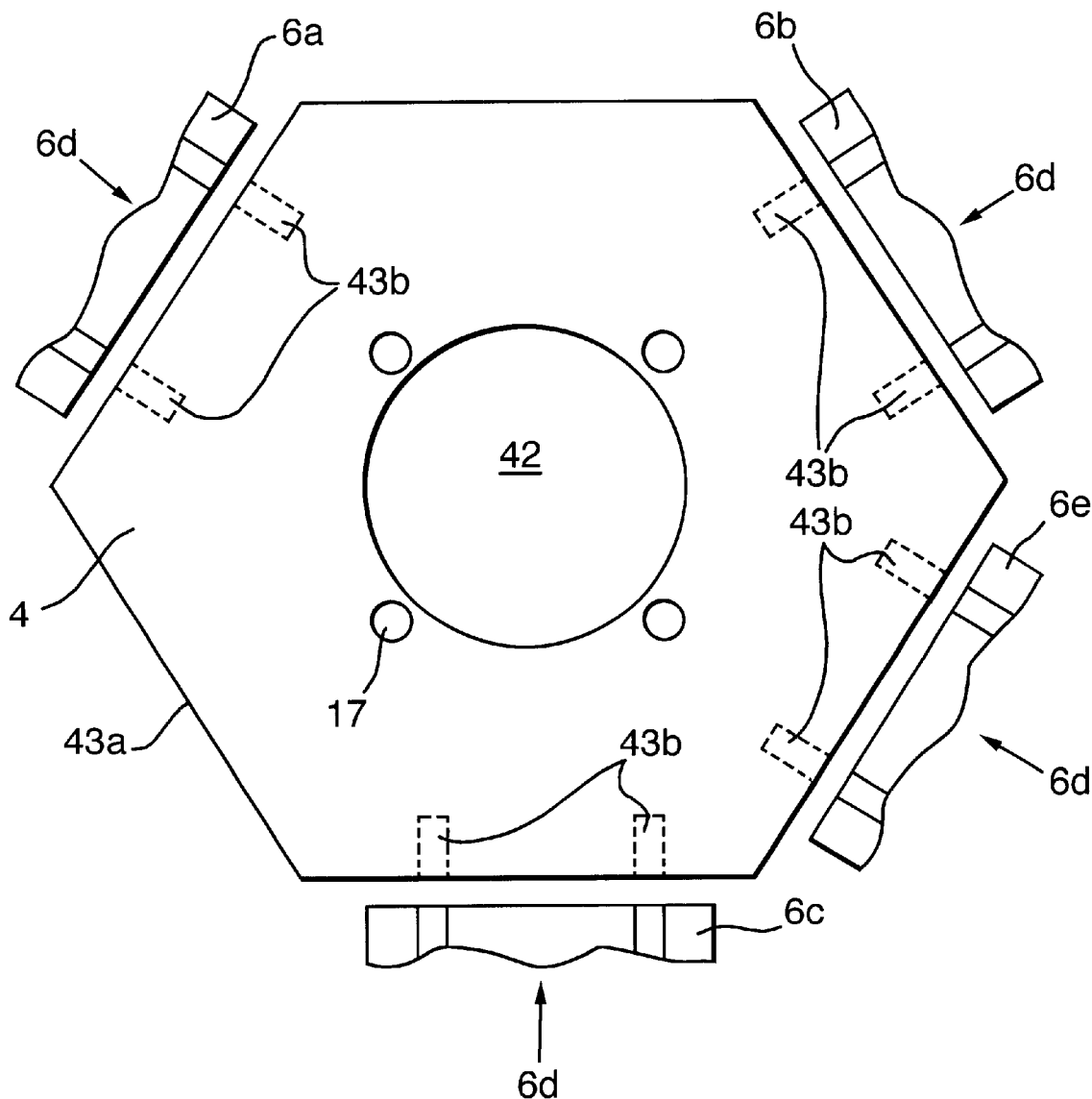
FIG. 12 is a plan view of the baseplate of FIG. 3 including four range finder units.

The baseplate 4, as shown in FIG. 9, is preferably a substantially rigid substantially regular hexagonal plate 41 with a hole therethrough 42 substantially in the centre thereof, which hole 42 is of sufficient diameter to allow any axially protruding parts of the surface working, testing or inspection device 1, which may be a drill or a welding torch, to pass therethrough when the surface working, testing or inspection device 1 is attached to the substantially rigid removable housing 19 and thence to the baseplate 4. Each of the three or more range finder units 6a, 6b, 6c is attachable to an outer perimeter 43a of the baseplate 4 by bolt means 43b and has a source 7 of 635 nm wavelength. As further shown in FIG. 9, the three or more range finder units are equi-spaced 6d around the outer perimeter 43a of the baseplate 4. FIG. 12 shows the baseplate 4 having four range finder units 6a, 6b, 6c, 6e, which four units 6a, 6b, 6d, 6e incur a non equal spacing thereof around the outer perimeter 43a.

Figure 11:
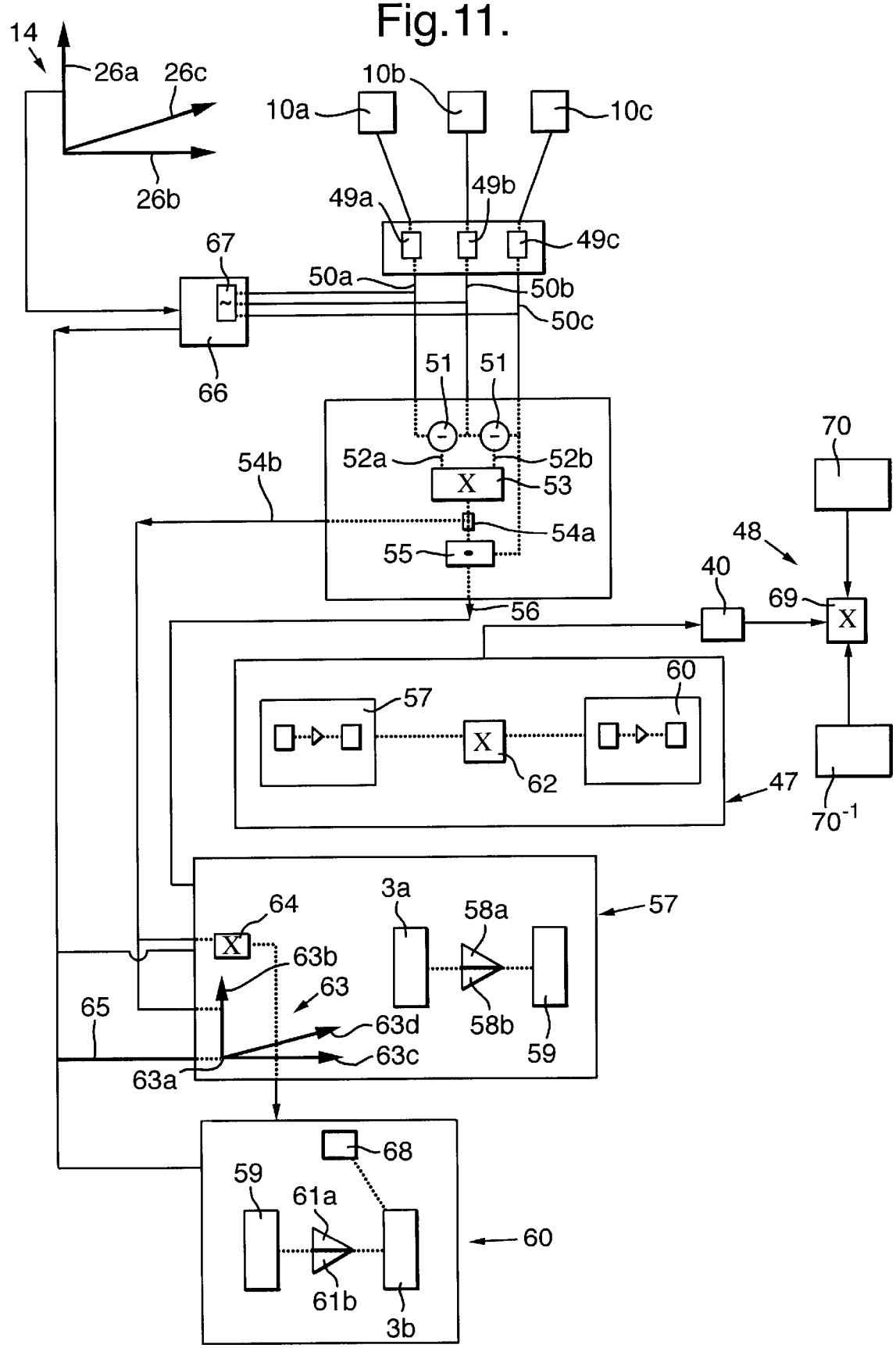
FIG. 11 is a block diagram illustrating a method according to the present invention for positioning the apparatus of FIG. 1.

The non-contact apparatus described above is operable to position the surface working, testing or inspection device 1 at the desired position and orientation 3b relative to the surface to be worked, tested or inspected 2 when operatively associated with a method directed thereto, which method is shown functionally in FIG. 11 and is generally concerned with the apparatus of FIGS. 1 to 10 and FIG. 12 in which like parts have been given like reference numerals and will not be described further in detail. For each of the range finder units 6a, 6b, 6c the axial components $[24i]_{a,b,c}[25i]_{a,b,c}$ of the position and direction mapping vectors 22a, 22b, 22c, 23a, 23b, 23c are determined from a geometric fit to a series of gauge block height measurements 44 corresponding to the surface beam impingement distance measurements 10a, 10b, 10c, which series of height measurements 44 is provided by the array of calibration positions 28a, 28b, 28c and corresponding beam impingement points 45a, 45b, 45c. The transverse and perpendicular components $[24j, 24k]_{a,b,c}$, $[25j, 25k]_{a,b,c}$ of the position and direction mapping vectors 22a, 22b, 22c, 23a, 23b, 23c are, for each of the range finder units 6a, 6b, 6c, determined from a regressive fit to an array of beam impingement points 45a, 45b, 45c located in the plane of the calibration plate 27 by a surface measuring instrument 30, and the array of beam impingement points 45a, 45b, 45c is provided by the array of calibration plate 27 calibration positions 28a, 28b, 28c.

As shown in FIG. 11 the distance measurements 10a, 10b, 10c are processed by determining a first position and orientation 3a of the surface working, testing or inspection device 1 relative to the surface 2, determining a required translation and/or rotation 47 of the surface working, testing or inspection device 1 in the baseplate co-ordinate frame of reference 14 in order to move said device 1 to the desired position and orientation 3b, and decoding 48 the required translation and/or rotation 47 of the device 1 from the baseplate co-ordinate frame of reference 14 into a co-ordinate frame of reference of the indexing means 16.

The first position and orientation 3a is determined by forming baseplate transformation equations 49a, 49b, 49c, shown in FIG. 11, corresponding to the three or more range finder units, which transformation equations combine each respective distance measurement 10a, 10b, 10c with each of the position mapping vectors 22a, 22b, 22c and the direction mapping vectors 23a, 23b, 23c, thereby defining, for each of the range finder units in turn, co-ordinates of the respective surface beam impingement point in the baseplate co-ordinate frame of reference 50a, 50b, 50c. The beam impingement points 50a, 50b, 50c are then combined by vectoral subtraction therebetween 51, so as to provide at least two surface vectors 52a, 52b, a cross-product 53 is taken of the at least two surface vectors 52a, 52b so as to provide a vector normal thereto 54a and from thence a unit vector 54b, and a scalar product 55 is taken of the vector normal 54a and any one of the beam impingement points 50a, 50b, 50c so as to define a first position plane 56.

As further shown in FIG. 11 the required translation and/or rotation 47 is determined by processing a first transformation 57, which first transformation 57 defines a translation and rotation 58a, 58b from the first position and orientation 3a to a temporary position and orientation 59, and a second transformation 60, which second transformation 60 defines a translation and rotation 61a, 61b from the temporary position and orientation 59 to the desired position and orientation 3b, and combining the first and second transformations 57, 60 by matrix multiplication 62 of said first and the inverse of said second transformations 57, 60 to provide a four row, four column homogenous matrix 40 describing the required rotation and translation 47 in the baseplate co-ordinate frame of reference 14. The temporary position and orientation 59 is defined by means of a temporary co-ordinate system 63, which is defined by an origin 63a and orthogonal axial, transverse and perpendicular axes 63b, 63c, 63d. The axial axis 63b is given by the unit vector normal 54b and the transverse axis 63c is given by a cross-product 64 of said unit vector normal 54b and a main axis unit vector 65, which unit vector 65 is derived from a main axis vector 66. The main axis vector 66 is defined as equal to the axial axis of the baseplate co-ordinate frame 26a, and is constrained to pass through a single point 67 corresponding to an average of the at least three beam impingement points 50a, 50b, 50c. The temporary co-ordinate system origin 63a is given by an intersection of the main axis vector 66 and the first position plane 56.

The first transformation translation 58a is given by a three row, one column translation matrix defined by translational components of a vector connecting an initial displacement from the surface to be worked, tested or inspected 2 and the temporary co-ordinate system origin 63a, which initial displacement is defined by the first position plane 56. The first transformation rotation 58b is given by a three row, three column rotation matrix having the temporary co-ordinate system transverse axis 63c as its first component, the temporary co-ordinate system axial axis 63b as its third component and the cross product of said first and third components as its second component.

The second transformation translation 61a is given by a three row, one column translation matrix defined by translational components of a vector connecting the temporary co-ordinate system origin 63a and a required displacement therefrom, which displacement is defined by a plane describing the desired position and orientation of the baseplate relative to the surface 3b in the temporary co-ordinate frame of reference. The second transformation rotation 61b is given by a three row, three column rotation matrix having the temporary co-ordinate system transverse axis 63c as its first component, a unit vector normal 68 to the desired position plane 3b as its third component and a cross product of said first and third components as its second component. The plane describing the desired position and orientation of the baseplate relative to the surface 3b is pre-specified.

The required translation and/or rotation 47, once derived according to the procedure hereinabove described, is decoded into the indexing means co-ordinate frame of reference by performing matrix multiplication 69 of a baseplate to indexing means mapping 70, the four row, four column homogenous matrix 40 describing the required rotation and translation 47 in the baseplate co-ordinate frame of reference, and the inverse of the baseplate to indexing means mapping 70, which baseplate to indexing means mapping 70 is constant.

The procedure for positioning a surface working, testing or inspection device 1 relative to a surface to be worked, tested or inspected 2 at a desired position and orientation 3b relative thereto includes an off-line calibration to determine the relative position of each range finder unit 6a, 6b, 6c in the baseplate co-ordinate frame of reference 14 through position and direction mapping vectors 22a, 22b, 22c, 23a, 23b, 23c. This procedure describes each range finder datum location 11a, 11b, 11c by axial, transverse and perpendicular components $[24i, 24j, 24k]_{a,b,c}$ in the baseplate co-ordinate frame of reference 14 as shown schematically in FIG. 5. The normality of each of the range finder sources relative to the surface to be worked, tested or inspected 8a, 8b, 8c is defined by vectoral axial, transverse and perpendicular components $[25i, 25j, 25k]_{a,b,c}$ in the baseplate co-ordinate frame of reference 14. As shown in FIG. 6 the height measurements taken using gauge blocks 29 between a calibration plate 27, positionable parallel to and at a range of distances from the baseplate 28a, 28b, 28c. The transverse and perpendicular components $[24j, 24k, 25j, 25k]_{a,b,c}$ are also empirically derived, but using a surface measuring instrument such as a Leica LTD500 SMART tracker (Trademark) 30 to determine the beam impingement points at each of the calibration positions.

Height measurements 44 from these three positions 28a, 28b, 28c provide a minimum data set for accurately determining the axial components, $[24i]_{a,b,c}$ of the position mapping vectors 22a, 22b, 22c using standard geometric methods. The axial components $[25i]_{a,b,c}$ of the direction mapping vectors 23a, 23b, 23c can be determined from a geometric fit to the measured heights 44 and the distances returned from the range finder units 8a, 8b, 8c. The transverse and perpendicular components $[24j, 24k, 25j, 25k]_{a,b,c}$ of the position and direction mapping vectors 22a, 22b, 22c, 23a, 23b, 23c can be determined from a linear fit to the array of surface beam impingement points 45a, 45b, 45c at calibration positions 28a, 28b, 28c according to a standard statistical deviation procedure such as the least squares method. The distances 8a, 8b, 8c are thus uncalibrated distance measurements, which, when transformed into direction mapping vectors 23a, 23b, 23c and combined with live distance measurements 10a, 10b, 10c, provide part of the calibrated co-ordinates of beam impingement points 12 in the baseplate frame of reference 14 (Equation 2 below).

The method for positioning a surface working, testing or inspection device 1 relative to a surface to be worked, tested or inspected 2 at a desired position and orientation thereto 3b requires knowledge of a first orientation and position 3a of the surface 2 relative to the baseplate 4 and thus to the device 1 when mounted thereon, and is derived from a first position plane 56 in the baseplate co-ordinate frame of reference 14. The equation of a plane is described according to the standard expression $$\hat{n} \cdot x = h \quad (1)$$

where n, x, h are the unit vector normal to the plane, a vector describing a point lying in the plane relative to a co-ordinate system origin remote therefrom and a perpendicular distance between said origin and plane respectively. Having received three valid distance measurements 10a, 10b, 10c, these are each combined with the position and direction mapping vectors 22a, 22b, 22c, 23a, 23b, 23c to establish the co-ordinates of the respective surface beam impingement point 12 in the baseplate coordinate frame of reference 50a, 50b, 50c according to the following expression $$s_p = d_p + \lambda_p v_p \quad (2)$$

where subscript p references a range finder unit 6a, 6b, 6c; $s_p$ represents co-ordinates 50a, 50b, 50c of the beam impingement points; $d_p$ represents position mapping vectors 22a, 22b, 22c; $\lambda_p$ represents distance measurements 10a, 10b, 10c; and $v_p$ represents direction mapping vectors 23a, 23b, 23c.

The beam impingement co-ordinates 50a, 50b, 50c are then manipulated by a series of vectoral procedures as hereinabove described to produce the required translation and/or rotation 47. This required translation and/or rotation 47 is in the baseplate co-ordinate frame of reference 14, and in order for this to effect a desired movement of the surface working, testing or inspection device 1 the four row, four column homogenous matrix 40 requires translation from the baseplate coordinate frame of reference 14 into a co-ordinate frame of reference of the indexing means 16. As there is no relative movement between the baseplate and the indexing means 16 once the robotic arm 36 is rigidly connected to the removable housing 19 and thereby to the surface working, testing or inspection device 1 when attached thereto, a baseplate to indexing means mapping 70 is determinable prior to assembly and use of the apparatus and can be assumed constant for a given measurement task.

Each of the three or more range finder units 6a, 6b, 6c is a commercially available sensor which uses eye-safe, Class 3b, laser light of wavelength 635 nm as its source 6, and the distance measurements 10a, 10b, 10c are calculated from diffuse reflection of the beam impingement 12, as shown in FIG. 4, imaged onto the detector 9. The range finder units 6a, 6b, 6c can operate within a large range of distances between a surface working, testing or inspection device 1 and a surface to be worked, tested or inspected 2, and the apparatus has hitherto been utilised over distances between 120 mm and 180 mm from the device 1 to surface 2. The accuracy of the distance measurements 10a, 10b, 10c calculated by the range finder units 6a, 6b, 6c is quoted by the manufacturer to be +/−0.005 mm. The units 6a, 6b, 6c are configured for cyclic use, typically characterised by a rapid on/off thereof, and in situations where the units 6a, 6b, 6c are used for significant periods of time (of the order 1 to 2 hours), the internal heating incurred requires an empirically derived compensation to be applied thereto.

Operational failure of one or more of the range finder units 6a, 6b, 6c could be corrected by the inclusion of at least one additional range finder unit 6e, which additional unit 6e is activatable upon receipt of an invalid signal from any of the units 6a, 6b, 6c. The baseplate 4 will then include four units 6a, 6b, 6c, 6e as shown in FIG. 12, and the spaced array 6d of the three operating units may not be equi-spaced.

What is claimed is:

1. Non-contact apparatus for positioning a surface working, testing or inspection device relative to a surface to be worked, tested or inspected at a desired position and orientation relative thereto, said apparatus comprising:
    a baseplate locatable at a distance away from the surface,
    means for mounting the surface working, testing or inspection device on the baseplate,
    at least three range finder units removably mounted in spaced array on the baseplate, each of said units includes
        a source for impinging a beam of electromagnetic radiation on the surface, and
        a detector for imaging the impinging radiation and for calculating a distance measurement from a datum location on the respective source to a point corresponding to the surface beam impingement,
    transformation means for translating each of said range finder distance measurements into a common baseplate co-ordinate frame of reference,
    a processor for receiving and processing the distance measurements to establish therefrom a first orientation and position of the surface relative to the baseplate, and thus to the surface working, testing or inspection device when mounted thereon, and
    indexing means in operative association with the processor for positioning the baseplate and surface working, testing or inspection device when mounted thereon at the desired position and orientation relative to the surface.

2. Apparatus according to claim 1, wherein the means for mounting the surface working, testing or inspection device on the baseplate includes at least four equi-spaced holes through the baseplate, at least four externally threaded shank bolts locatable through said holes, and a substantially rigid removable housing attachable to the surface working, testing or inspection device, which removable housing is a hollow cylinder with at least one end partially open, which partially open end has at least four transverse internally threaded equi-spaced holes for threadable engagement by said shank bolts for securing the housing to the baseplate.

3. Apparatus according to claim 1, wherein the transformation means includes mapping vector means operable to provide a position mapping vector and a direction mapping vector for each of the range finders, which position mapping vectors describe each range finder datum location by axial, transverse and perpendicular components in the baseplate co-ordinate frame of reference, which baseplate co-ordinate frame is characterised by axial, transverse and perpendicular orthogonal axes, and which direction mapping vectors describe the normality of each range finder sensor relative to the surface to be worked, tested or inspected by vectoral axial, transverse and perpendicular components in the baseplate co-ordinate frame of reference.

4. Apparatus according to claim 3, wherein the mapping vector means includes a substantially rigid, substantially planar calibration plate locatable at an array of calibration positions between the baseplate and the surface, which calibration plate is, at each of the calibration positions, located substantially parallel to the baseplate, gauge blocks of a pre-determined thickness locatable between the baseplate and the calibration plate, which gauge blocks provide means for determining the axial components of the position mapping vectors, and a surface measuring instrument, which surface measuring instrument provides means for determining the transverse and perpendicular components of the position mapping vectors and thence the direction mapping vectors.

5. Apparatus according to claim 4, including a series of communication links between the processor and each range finder unit for receiving the distance measurements, which links include a control box in operative association with a power supply, which control box is operable to sample the range finder distance measurements at a desired rate, a multi-core cable connecting the range finder unit to the control box, and a serial cable connected between the control box and the processor for communicating the sampling rate to the control box.

6. Apparatus according to claim 5, wherein the indexing means includes a robotic arm having six servo motors attached thereto, which arm is rigidly connected to the removable housing and thereby to the surface working, testing or inspection device when attached thereto, a robot controller for controlling the servo motors, which robot controller is connected to the processor by a serial cable for receiving therefrom a 4×4 (four row four column) homogenous matrix describing a rotation and translation required to position the baseplate and thereby the surface working, testing or inspection device when mounted thereon, at the desired position and orientation relative to the surface to be worked, tested or inspected.

7. Apparatus according to claim 6, wherein the baseplate is a substantially rigid substantially regular hexagonal plate with a hole therethrough substantially in the centre thereof, which hole is of sufficient diameter to allow any axially protruding parts of the surface working, testing or inspection device to pass therethrough when the surface working, testing or inspection device is attached to the substantially rigid removable housing and thence to the baseplate.

8. Apparatus according to claim 7, wherein each of the three or more range finder units is attachable to an outer perimeter of the baseplate by bolt means, and wherein the units are equi-spaced therearound.

9. Apparatus according to claim 8, wherein each range finder unit has a radiation source with a laser spot of 635 nm wavelength.

10. Apparatus according to claim 9 wherein the surface working, testing or inspection device is a drill.

11. Apparatus according to claim 10 wherein the surface working, testing or inspection device is a welding torch.

12. Apparatus according to claim 11 having four range finder units.

13. A method for positioning a surface working, testing or inspection device relative to a surface to be worked, tested or inspected at a desired position and orientation thereto, said method comprising the steps of:

mounting the surface working, testing or inspection device on the baseplate locatable at a distance away from the surface, removably mounting at least three range finder units in spaced array on the baseplate, wherein each of said units includes a source of electromagnetic radiation and a detector for the radiation, a beam of said radiation is impinged by each unit on the surface, imaged by the detectors and used to calculate a distance measurement from a datum location on the respective source to a point corresponding to the surface beam impingement, transforming each of said range finder distance measurements into a common baseplate co-ordinate frame of reference, processing the distance measurements by a processor to establish therefrom an orientation and position of the surface relative to the baseplate, and thus to the surface working, testing or inspection device mounted thereon, and positioning the baseplate and surface working, testing or inspection device at the desired position and orientation relative to the surface.

14. A method according to claim 13, in which the transform step provides a position tapping vector and a direction mapping vector for each of the range finders, which position mapping vectors describe each range finder datum location by vector axial, transverse and perpendicular components is in the baseplate co-ordinate frame of reference, and which direction mapping vectors describe the normality of each range finder sensor relative to the surface to be worked, tested or inspected by vectoral axial, transverse and perpendicular components in the baseplate co-ordinate frame of reference.

15. A method according to claim 14, in which the axial components of the position mapping vectors are determined from a geometric fit to a series of gauge block height measurements corresponding to the surface beam impingement distance measurements returned by each of the at least three range finder units, which beam impingement is provided by a substantially rigid calibration plate positioned substantially parallel to the baseplate, and which series of height measurements is provided by a positioning of the calibration plate at an array of calibration positions thereunder, and in which the transverse and perpendicular components of the position mapping vectors are determined from a regressive fit to an array of beam impingement points located in the plane of the calibration plate by a surface measuring instrument, which array of beam impingement points is provided by the array of calibration plate calibration positions.

16. A method according to claim 15, in which the distance measurements are processed by determining a first position and orientation of the surface working, testing or inspection device relative to the surface, determining a required translation and/or rotation of the surface working, testing or inspection device in the baseplate co-ordinate frame of reference in order to move said device to the desired position and orientation, and decoding the required translation and/or rotation of the surface working, testing or inspection device from the baseplate co-ordinate frame of reference into a co-ordinate frame of reference.

17. A method according to claim 16, in which the first position and orientation is determined by forming a baseplate transformation equation for each range finder unit, which transformation equation combines each respective distance measurement with each of the position mapping vectors and the direction mapping vectors, thereby defining, for each of the range finder units in turn, co-ordinates of the respective surface beam impingement point in the baseplate coordinate frame of reference, combining the beam impingement points in the baseplate co-ordinate frame of reference by vectoral subtraction therebetween so as to provide at least two surface vectors, taking a cross-product of the at least two surface vectors so as to provide a vector normal thereto, and from thence a unit vector, and taking a scalar product of the vector normal and any one of said beam impingement points in the baseplate co-ordinate frame of reference so as to define a first position plane.

18. A method according to claim 17, in which the required translation and/or rotation is determined by processing a first transformation, which first transformation defines a translation and rotation from the first position and orientation to a temporary position and orientation, and a second transformation, which second transformation defines a translation and rotation from the temporary position and orientation to the desired position and orientation, and combining the first and second transformations by matrix multiplication of said first and the inverse of said second transformations to provide a standard 4×4 (four row, four column) homogenous matrix describing the required rotation and translation in the baseplate co-ordinate frame of reference.

19. A method according to claim 18, in which the temporary position and orientation is defined by means of a temporary coordinate system, which temporary co-ordinate system is defined by an origin and orthogonal axial, transverse and perpendicular axes, which axial axis is given by the unit vector normal and which transverse axis is given by a cross-product of said unit vector normal and a main axis unit vector, which main axis vector is defined as equal to the axial axis of the baseplate co-ordinate frame and is constrained to pass through a single point corresponding to an average of the at least three range finder position mapping vectors, and which temporary co-ordinate system origin is given by an intersection of the main axis vector with the first position plane.

20. A method according to claim 19 in which the first transformation translation is given by a 3-by-1 (three row, one column) translation matrix defined by translational components of a vector connecting an initial displacement from the surface to be worked, tested or inspected and the temporary co-ordinate system origin, which initial displacement is defined by the first position plane, and the first transformation rotation is given by a 3-by-3 (three row, three column) rotation matrix having the temporary co-ordinate system transverse axis as its first component, the temporary co-ordinate system axial axis as its third component and the cross product of said first and third components as its second component, and in which the second transformation translation is given by a 3-by-1 (three row, one column) translation matrix defined by translational components of a vector connecting the temporary co-ordinate system origin and a required displacement therefrom, which displacement is defined by a plane describing the desired position and orientation of the baseplate relative to the surface, and in which the second transformation rotation is given by a 3-by-3 (three row, three column) rotation matrix having the temporary co-ordinate system transverse axis as its first component, a unit vector normal to the desired position plane as its third component and a cross product of said first and third components as its second component.

21. A method according to claim 20, in which the required translation and/or rotation of the surface working, testing and inspection device in the baseplate co-ordinate frame of reference is decoded into a co-ordinate frame of reference by matrix multiplication of a baseplate to matrix mapping, the 4×4 (four row, four column) homogenous matrix describing the required rotation and translation in the baseplate coordinate frame of reference, and the inverse of the baseplate to matrix mapping.

22. A method according to claim 21, in which the baseplate to matrix mapping translates the baseplate co-ordinate frame of reference into the co-ordinate frame of reference, which mapping is substantially constant.

* * * * *